United States Patent
Gill

(10) Patent No.: US 9,514,052 B2
(45) Date of Patent: Dec. 6, 2016

(54) WRITE-THROUGH-AND-BACK-CACHE

(75) Inventor: Binny S. Gill, Shrewsbury, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 457 days.

(21) Appl. No.: 13/567,350

(22) Filed: Aug. 6, 2012

(65) Prior Publication Data

US 2012/0303906 A1 Nov. 29, 2012

Related U.S. Application Data

(63) Continuation of application No. 13/101,984, filed on May 5, 2011, now abandoned.

(51) Int. Cl.
G06F 12/08 (2016.01)

(52) U.S. Cl.
CPC ....... *G06F 12/0866* (2013.01); *G06F 12/0804* (2013.01); *G06F 2212/1032* (2013.01); *G06F 2212/222* (2013.01)

(58) Field of Classification Search
USPC .......... 711/103, 113–118, 142–143, 161–162
See application file for complete search history.

(56) References Cited

U.S. PATENT DOCUMENTS

| | | | |
|---|---|---|---|
| 4,507,751 A | 3/1985 | Gawlick et al. | |
| 5,297,258 A * | 3/1994 | Hale et al. | 711/114 |
| 5,522,057 A | 5/1996 | Lichy | |
| 5,581,750 A | 12/1996 | Haderle et al. | |
| 5,666,514 A | 9/1997 | Cheriton | |
| 5,835,955 A | 11/1998 | Dornier et al. | |
| 5,893,155 A | 4/1999 | Cheriton | |
| 6,141,731 A | 10/2000 | Beardsley et al. | |
| 6,161,208 A | 12/2000 | Dutton et al. | |
| 6,240,508 B1 | 5/2001 | Brown, III et al. | |
| 6,496,905 B1 * | 12/2002 | Yoshioka et al. | 711/154 |
| 6,748,463 B1 | 6/2004 | Tsuboi et al. | |
| 2002/0156972 A1 * | 10/2002 | McKnight et al. | 711/114 |
| 2006/0031267 A1 | 2/2006 | Lim et al. | |
| 2007/0233950 A1 * | 10/2007 | Innan | G06F 1/3221 711/114 |

(Continued)

OTHER PUBLICATIONS

Definition of Limited, Google Define, retrieved from https://www.google.com/search?q=define%3A+limited&oq=define%3A+limited&aqus=chrome.0.57j58j6213, 4240&sugesp=chrome,mod=0&sourceid=chrome&ie=UTF-8 on Nov. 22, 2013; 1 pages.

(Continued)

*Primary Examiner* — Yaima Rigol
(74) *Attorney, Agent, or Firm* — Cantor Colburn LLP; Bryan Butler

(57) ABSTRACT

Embodiments are provided for cache memory systems. In one general embodiment, a method that includes receiving a host write request from a host computer, creating a sequential log file in a storage device, and copying data received during the host write request to a storage buffer. The method further includes determining if a selected quantity of data has been accumulated in the storage buffer and executing a write through of data to sequentially write the data accumulated in the storage buffer to the sequential log file and to a storage class memory device if the selected quantity of data has been accumulated in the storage buffer.

26 Claims, 2 Drawing Sheets

(56) References Cited

U.S. PATENT DOCUMENTS

| | | | |
|---|---|---|---|
| 2008/0059732 A1* | 3/2008 | Okada | G06F 11/1471 711/162 |
| 2011/0082967 A1* | 4/2011 | Deshkar et al. | 711/103 |
| 2011/0113260 A1* | 5/2011 | Ma et al. | 713/193 |
| 2011/0138106 A1* | 6/2011 | Prabhakaran | G06F 12/0804 711/103 |
| 2011/0296236 A1* | 12/2011 | Kawamoto | G06F 11/0727 714/6.21 |
| 2012/0047332 A1* | 2/2012 | Bannon et al. | 711/135 |
| 2012/0303906 A1 | 11/2012 | Gill | |

OTHER PUBLICATIONS

Definition of Metadata, Free Online Dictionary of Computing, retrieved from http://foldoc.org/metadata on Nov. 19, 2013; 1 pages.

Definition of Pointer, Free Onlin Dictionary of Computing, retrieved from http://foldoc.org/pointer on Nov. 19, 2013; 1 pages.

Definition of "Redundant Array of Independent Disks", The Free Dictionary by Farlex, retrieved from http://encyclopedia2.thefreedictionary.com/Redundant+Array+of+Independent+Disks.

Roberts et al., "Integrating NAND Flash Devices onto Servers" Communications of the ACM, vol. 52. No. 4, Apr. 2009; 9 pages.

The Free Dictionary definition of "Redundant Array of Independent Disks", The Free Dictionary by Farlex, retrieved from http://encyclopedia2.thefreedictionary.com/Redundant+Array+of+Independent+Disks.

Patterson, et al., "A Case for Redundant Arrays of Inexpensive Disks (RAID)", University of California at Berkeley Berkeley, CA, USA, ACM, 1988, retrieved from http://www.cs.cmu.edu/~garth/RAIDpaper/Patterson88.pdf on Jun. 18, 2013; 8 pages.

Jing Mei Li, Wen Jia Liu, Ping Jiao; "A New Kind of Cache Coherence Protocol with SC-Cache for Multiprocessor", pp. 1-5, Pub.: 2010.

\* cited by examiner

WRITE-THROUGH-AND-BACK-CACHE

CROSS REFERENCE TO RELATED APPLICATIONS

This application is a continuation of U.S. application Ser. No. 13/101,984 filed on May 5, 2011 entitled WRITE-THROUGH-AND-BACK CACHE, the entire contents of which are incorporated herein by reference.

BACKGROUND

The present invention relates generally to computer cache memory systems, and more particularly, to a cache memory that includes aspects of write-through and write-back caches.

Data may be stored and retrieved from some types of memory devices used in computer systems more rapidly than for other types of memory devices. For example, DRAM (dynamic random access memory) is relatively low in cost and has fast access. However, a disadvantage of DRAM is that is it is volatile and data stored in DRAM is lost when power is removed from the memory devices. Disk storage devices with magnetic, optical, or other types of rotating disk media are nonvolatile, have very low cost per byte of storage, and very high storage capacity. However, a disadvantage of disk storage devices is that they have relatively slow access for storing and retrieving data.

To reduce access times for disk storage devices, cache memory systems may be used to hold data that has been recently read or modified and may also hold data areas adjacent to recently read or modified data. The latency for cache memory devices is generally somewhere between latency for DRAM and latency for disk storage devices. The term latency refers to a time delay between initiation of a read request, to read requested data, or write request, to write requested date to storage, a memory device and the retrieval of data from or storage of data to the memory device. Relatively fast memory devices such as DRAM or flash memory may be used in cache memory systems. "Flash" memory is a type of nonvolatile memory device with faster access time than disk storage devices, but slower access time than DRAM memory devices. While flash memory devices have faster access time than disk storage devices, they are generally considered to be too expensive to be used for the entire memory space in a computer system. A combination of DRAM, cache memory, and disk storage may therefore be used to achieve a balance between system performance and system cost.

The difference in latency between disk storage devices and DRAM has increased over time. While the storage capacities of both DRAM and disk storage have increased and memory cost per byte has decreased over time, the ratio in a computer system of storage capacity implemented as cache memory to storage capacity implemented as disk storage has remained relatively small. As costs for flash memory decrease, it has become a viable consideration to use flash memory devices in cache memory applications, such as write-through caches and write-back caches.

In a write-through cache, data is written to the cache memory and to the disk storage device at about the same time. In a write-back cache, data to be saved is not immediately written to the disk storage device. Instead, data to be saved is written into the cache, the cache monitors which of its locations have been modified, and the modified cache locations are marked as "dirty data." Dirty data is data that has not yet been written to a disk storage device. Data is copied from the write-back cache to a disk storage device when a data replacement algorithm determines the dirty data may be removed from the cache.

BRIEF SUMMARY

In one embodiment, a method that includes receiving a host write request from a host computer, creating a sequential log file in a storage device, and copying data received during the host write request to a storage buffer. The method further comprises determining if a selected quantity of data has been accumulated in the storage buffer and executing a write through of data to sequentially write the data accumulated in the storage buffer to the sequential log file and to a storage class memory device if the selected quantity of data has been accumulated in the storage buffer.

BRIEF DESCRIPTION OF THE SEVERAL VIEWS OF THE DRAWINGS

For a fuller understanding of the nature and advantages of the invention, as well as a preferred mode of use, reference should be made to the following detailed description read in conjunction with the accompanying drawings, in which.

DETAILED DESCRIPTION

Figure 1:
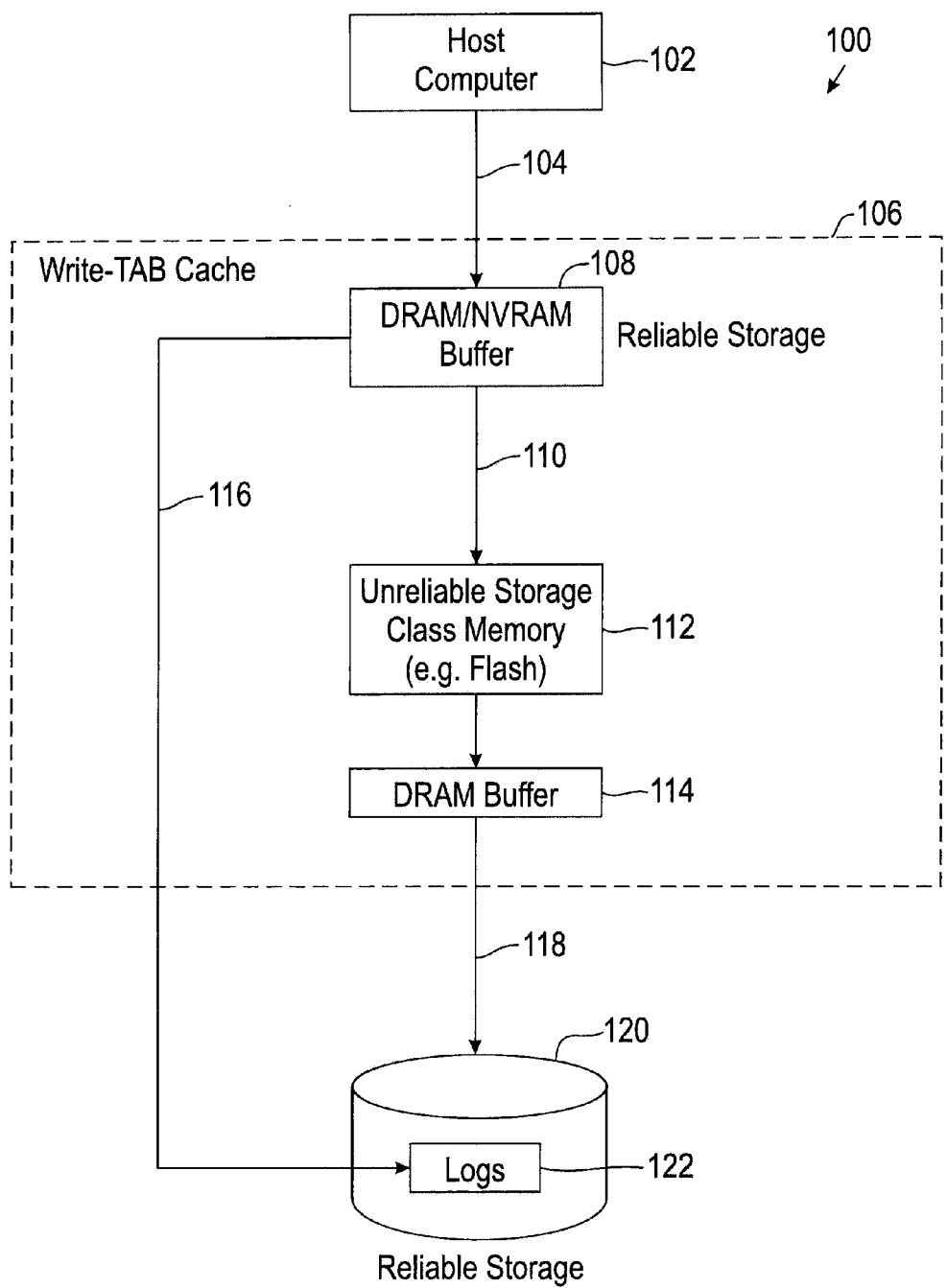
FIG. 1 is a functional block diagram showing an embodiment of a of a write-TAB cache in data communication with a data storage device.

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In one general embodiment, a system that includes a host, at least one storage device, and at least one storage class memory device operating as a write cache for the storage device. The storage device further includes a first storage location for data received from a host computer during a host write request and a second storage. Data received from a host write request is written to the storage class memory device, to the first location in the storage device, and to the second location in the storage device that logically reflects the location of the data in the storage class device location configured as a log structured file.

In another embodiment, a computer system with a host, a write-through-and-back cache, and a plurality of disk storage devices arranged in a selected Redundant Array of Independent Disks configuration. Data received by the write-through-and-back cache is stored in the write-through-and-back cache and in two different storage locations in the storage devices, and wherein a second storage location of the two different storage locations a second storage location logically reflects the location of the data in a storage class device of the write-through-and-back cache.

In another embodiment, a computer readable storage medium having computer readable program code embodied therewith. The computer readable program code comprises computer readable program code configured to receive a host write request from a host computer, computer readable program code configured to create a sequential log file in a storage device, and computer readable program code configured to copy data received during the host write request to a storage buffer. The computer readable program code further comprises computer readable program code configured to determine if a selected quantity of data has been accumulated in the storage buffer, and computer readable program code configured to execute a write through of data to sequentially write the data accumulated in the storage buffer to the sequential log file and to a storage class memory device if the selected quantity of data has been accumulated in the storage buffer. The computer readable program code additionally comprises computer readable program code configured to receive a host write request from the host computer if the selected quantity of data has not been accumulated in the storage buffer, computer readable program code configured to execute a write back of data if it is determined that data is to be destaged from the storage class memory device, and computer readable program code configured to write the data to a logical block address in the storage device specified by the host write request Referring now to FIG. 1, in one embodiment a system 100 includes a write-through-and-back cache, referred to hereinafter as a write-TAB cache, in communication with a host computer 102 and at least one so-called "reliable" storage device 120. Examples of a "reliable" storage device 120 include, but are not limited to, a disk drive with rotating magnetic media, a disk drive with rotating optical media, a disk drive with fixed rotating media, a disk drive with removable rotating media, and a magnetic tape system. The storage device 120 may further alternatively comprise a single-disk disk drive, a selected RAID (redundant array of independent disks) configuration of more than one disk drives, or a plurality of disk drives connected for operation according to other data storage protocols known in the art.

The write-TAB cache 106 may optionally be located in the host computer 102. Alternatively, the write-TAB cache 106 may be located in an external peripheral device or other suitable location.

In one embodiment, the write-TAB cache 106 includes a storage buffer 108 for receiving data sent from the host computer 102. The storage buffer 108 may comprise a so-called "reliable" storage buffer and may comprise either comprise volatile DRAM or nonvolatile random access memory (NVRAM), for example. The storage buffer 108 is connected for data communication to a memory 112 in the write-TAB cache 106.

In one embodiment, the memory 112, may comprise a storage class memory (SCM). Storage class memory (SCM) comprises an emerging data storage technology, where solid state, nonvolatile, non-rotating, and random access memory devices are being developed as an alternative to conventional disk-type data storage devices. Systems using storage class memory devices may experience a substantial reduction in the amount of space and power consumed by such a system as compared to similar disk-based systems, for example.

Flash memory, which is a known non-volatile computer storage memory device that can be electrically erased and reprogrammed, is an example of storage class memory (SCM). Flash memory devices are known to suffer from multiple wear-out mechanisms, i.e., failures from repeated read/write cycles, which over time increase the probability of data corruption or data loss. Currently, flash memory may be expected to be less reliable, i.e. have a greater probability of data corruption or device failure, than disk-type storage devices or DRAM. Such failures reduce the reliability of computer systems using flash memory devices and represent a challenge to the use of flash memory devices in cache memory applications. The problem of flash memory reliability is multiplied in RAID (redundant array of independent disks) applications, where flash memory failures tend to be correlated as the devices may wear out together. Using flash memory as a write-back cache therefore requires the implementation of computationally expensive redundancy codes and health-tracking algorithms for predicting end-of-life for the flash memory devices.

In one embodiment, the memory 112, may comprise a flash memory, or other suitable storage class memory (SCM), that functions as a write cache within the write-TAB cache 106 for other, slower memory devices served by the write-TAB cache 106.

In one embodiment, data in the memory 112, hereinafter flash memory 112, is read to determine if a cache hit occurs during a read request from the host computer 102. Data from the flash memory 112 is also read to serve a cache hit. A DRAM buffer 114 within the write-TAB cache 106 receives data from flash memory 112.

In one embodiment, the storage device 120 receives data from the write-TAB cache 106 during a write back step on a write back connection 118. The storage device 120 receives another copy of the data from the write-TAB cache 106 during a write through step on a write through connection 116 between the storage buffer 108 and a sequential log file 122, referred to hereinafter as sequential log 122, for ease of clarity only. In one embodiment, the sequential log 122 may be collocated in the same physical storage components as the data it caches or could alternately be located in a separate physical or virtual storage device having approximately the same, or better, operational reliability than the storage devices 120 used to store other data.

When a host write request 104 is presented by the host computer 102 to the write-TAB cache 106, the modified data to be written is first stored in the storage buffer 108. In one embodiment, the storage buffer 108 is relatively small, for example about 64 kilobytes, and is able to retain the modified data reliably. After the storage buffer 108 has sufficient data to write to the storage device 120, the data is written sequentially through the write through connection 116 to one or more sequential logs 122 on the storage device 120. Thus, data is written to the storage device 120 in location that logically reflects the location of the data in the flash memory device 112. Doing this, avoids the necessity of maintaining mapping between the contents of the flash memory 112 and the location of the data on the storage device 120.

The same data written to the storage device 120 in the write-through step is also written to the flash memory 112 when a selected quantity of data has been accumulated. The quantity of data to be accumulated before a write to either the flash memory 112 and storage device 120 is selected according to the hardware used. For example, in some embodiments, a selected quantity of data is in a range from about 64 kilobytes to about 256 kilobytes. Embodiments are easily adapted for other selected quantities of data to be accumulated before a write occurs.

In one embodiment, the write-TAB cache 106 may employ any of several write cache algorithms known in the art for determining when data should be destaged (e.g., ejected) from the write-TAB cache 106. After it has been determined that some data is to be destaged from the write-TAB cache 106, the data to be written to storage device 120 is copied into the DRAM buffer 114. From there the data is written to the storage device 120 through write back connection 118. Data is written at a logical block address in the storage device 120 as specified in the host write request 104.

In one embodiment, the write-TAB cache 106 may functions as a read cache. After being read from the storage device 120, data is copied to the storage buffer 108, from where the data are batched and sent to the flash memory 112 for caching. The data read from the storage device 120 are unmodified data and are protected from loss, by virtue of having copies of the data in both the storage device 120 and flash memory 112.

In the event the flash memory 112 loses some or all of its data or some of the data is otherwise corrupted, the sequential log 122 on the storage device 120 may be read to recover the lost data. As replacement data corresponding to lost data is read from the sequential log 122, the data is repopulated into the flash memory 112 in healthy, i.e., uncorrupted or undamaged, locations. In one embodiment, a background process may be started to read all the data that was lost from the sequential log 122 into the flash memory 112. Successful recovery of lost data requires the flash memory 112 to have enough storage capacity available to receive all the recovered data. If sufficient free space in the flash memory 112 is not available, for example because some part of the flash memory 112 has failed or become corrupted, then only modified data may be read from the sequential log 122. Furthermore, the modified data in the flash memory 112 may optionally be destaged and a portion of the unmodified data in the flash memory 112 may be removed.

While the flash memory 112 may be less reliable than the storage buffer 108 or storage device 120, the write-TAB cache 106 does not decrease reliability of a storage system below that of the storage buffer 108 and storage device 120. Since the modified, and optionally the unmodified, data in the flash memory 112 is also replicated in the storage device 120 as one or more sequential logs 122, the reliability of the flash memory 112 paired with its copy in the storage 120 provides improved reliability, as compared to the reliability of the storage device 120 alone, even though the sequential logs 122 can be located in the same physical storage components as the data it caches.

In one embodiment, the write-TAB cache 106 may keep track of what it has cached in the form of metadata. The metadata may be logged along with the data, into the sequential log 122. Including the metadata in the sequential log 122 may protect the Write-TAB cache 106 from metadata loss.

Compared to a known write back cache, the write-TAB cache 106 adds the overhead of writing the sequential logs 122 onto the storage device 120. It should be noted that disk drives and tape drives are able to deliver an order of magnitude better performance for sequential (log-like) writes than for random writes. Thus, the additional burden imposed by the sequential logs 122 in a system employing a write-TAB cache 106 compared to a system using only a write back cache is relatively small. For example, in calculations of the storage benchmark SPC-1 known to those familiar with measurements of storage system performance, the additional burden imposed by a write-TAB cache compared to a system known in the art having a conventional write through cache was calculated to be only 6.49%.

The sequential log 122 in FIG. 1 is preferably to be managed so that its overall size is less than a selected limit. In one embodiment, log-structured writes are done for both the flash memory 112 and the sequential logs 122. Log-structured writes to the flash memory 112 may cause memory occupied by data that is no longer in use by the system to be reclaimed, a resource management process sometimes referred to as "garbage collection." This may be an advantage of the discussed approach. If the sequential log 122 simply replicates the contents of the flash memory 112, then the size of the sequential log will be equal to the size of the flash memory and is therefore not a significant contributor to system cost, and writes will also be sequential. In another embodiment, only modified data is written in the sequential log 122. In this case, the maximum size of the sequential log 122 is also equal to the size of the flash memory 112.

In one embodiment, the write-TAB cache 106 optionally saves metadata that keeps some pointers for recording corresponding locations between the flash memory data and log data. In the event of a data loss in the flash memory 112, the data read will require some amount of scanning from a nearest recording pointer location within the sequential log 122. Yet another approach may be to allow non-log-structured writes within the flash memory 112, but record the corresponding location within the sequential log 122 for each data item. In this case, metadata will is stored in a reliable storage, such as NVRAM, disk storage device, or combinations thereof.

Figure 2:
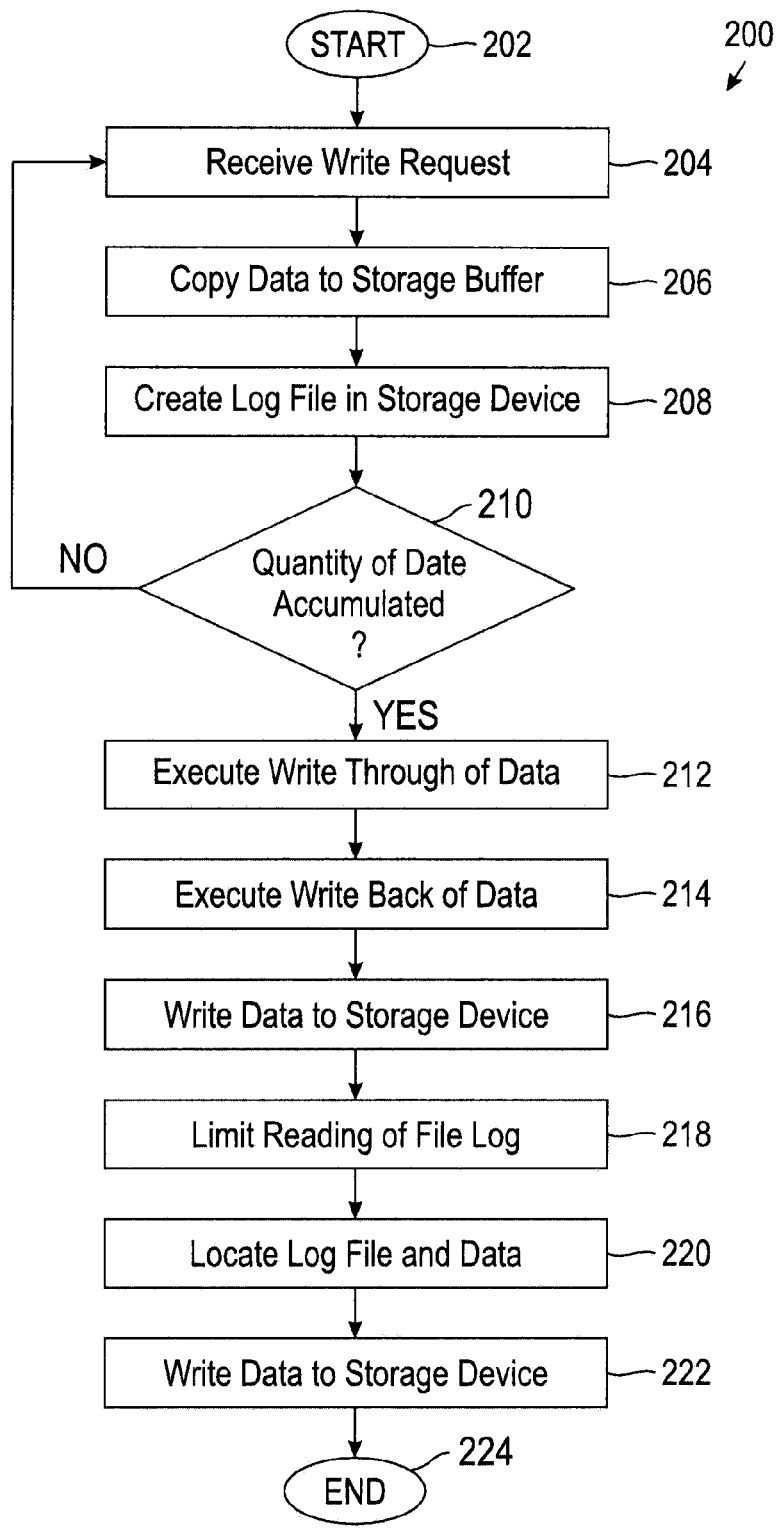
FIG. 2 is a flow diagram showing an embodiment of an execution of a method.

Referring to FIG. 1 and FIG. 2 of the drawings, FIG. 2 shows an embodiment of a disk cache method 200. The method 200 commences at start step 202. Next, at step 204, a write request is received from the host computer 102. At step 206, data received during the write request is copied to the storage buffer 108. At step 208, a sequential log 122 is created in the storage device 120.

Next, at step 210, it is determined if a selected quantity of data has been accumulated in the storage buffer 108, for writing the data to the storage device 120. If it is determined that the selected quantity of data has not yet accumulated in the storage buffer 108, then the method returns to step 204. If it is determined that the selected quantity of data has accumulated in the storage buffer 108, then the method continues to step 212.

At step 212, a write through of data is executed and data is copied from the storage buffer 108 to one or more sequential logs 122 in the storage device 120 through the write through connection 116. Data is also written to the flash memory 112 at this time. Data is thus written to the storage device 120 in a location that logically reflects the location of the data in the flash memory device 112. Writing the data in location in the storage device 120 that logically reflects the location of the data in the flash memory 112, obviates the need for retaining mapping between the contents of the flash memory 112 and the location of the data on the storage device 120.

Next, at step 214, a write back of data may be executed. After it has been determined that some data is to be destaged from the write-TAB cache 106, the data to be written to storage device 120 is copied into the DRAM buffer 114. At step 216, data is written from the DRAM buffer 114 to the storage device 120 through write back connection 118. At this time, data is written at a logical block address in the storage device 120 as specified in the write request 104.

An embodiment of the method 200 may additionally include any of the following steps: at step 218, limiting reading of the sequential file log for recovery of data lost from either the flash memory 112 or the storage device 120; at step 220, locating the sequential log file and data received during a write request on separate storage devices 120; and at step 222, writing data received during a write request at a logical block address in a storage device 120 as specified in the host write request. The method 200 ends at step 224.

Those skilled in the art will appreciate that various adaptations and modifications can be configured without departing from the scope and spirit of the embodiments described herein. Therefore, it is to be understood that, within the scope of the appended claims, the embodiments of the invention may be practiced other than as specifically described herein.

What is claimed is:
1. A method comprising:
receiving a host write request from a host computer;
creating a sequential log, file in a storage device;
copying data received during the host write request to a storage buffer, wherein the storage buffer is configured as part of a write-through-and-back cache;
determining if a selected quantity of data has been accumulated in the storage buffer;
based on determining that the selected quantity of data has been accumulated in the storage buffer, executing a write through of data to sequentially write the data accumulated in the storage buffer to the sequential log file and to a storage class memory device, wherein the sequential log file is stored in a separate physical or virtual storage device than the storage class memory device;
receiving modifications to data stored in the storage class memory device;
saving the modifications to both the storage class memory device and the sequential log file;
storing metadata comprising pointers to locations of the modifications stored in the sequential log file, wherein the metadata is stored in both the sequential log file and the storage class memory device to protect against loss of the metadata stored in the storage class memory device; and in the event of a loss of data stored in the storage class memory device, utilizing the metadata to limit reading of the sequential log file to recovery of data lost from the storage class memory device.

2. The method of claim 1, further comprising:
executing a write back of data if it is determined that data is to be destaged from the storage class memory device; and
writing the data to a logical block address in the storage device specified by the host write request.

3. The method of claim 1, further comprising:
reading of the sequential log file to recover data lost from the storage class memory.

4. The method of claim 1, further comprising:
storing the metadata and the data received during the host write request on separate storage devices.

5. The method of claim 1, further comprising:
operating the storage class memory device to communicate with the storage buffer and configured to receive input data from the write request; and
operating a dynamic random access buffer in communication with the storage class memory and with the storage device.

6. A system comprising:
a storage device including one or more data drives; and
at least one storage class memory device operating, as part of a write-through-and-back cache for the storage device; the storage device further comprising:
a first storage location for storing data received from a host computer during a host write request; and
a second storage location;
wherein data received from a host write request is written to the storage class memory device, to the first storage location in the storage device, and to the second storage location in the storage device in a manner that that logically reflects the location of the data in the storage class device, wherein the sequential log file is stored in a separate physical or virtual storage device than the storage class memory device;
wherein modifications to data stored in the storage class device are written to both the storage class device and to the second storage location;
wherein metadata comprises pointers to storage locations for the modifications stored in the second location, wherein the metadata is stored in both the second storage location and the storage class memory device to protect against loss of the metadata stored in the storage class memory device; and
wherein, in the event of a loss of data stored in the storage class device, the metadata is utilized to limit reading of second storage location to recovery of data lost from the first storage location.

7. The system of claim 6, wherein the second storage location is configured as a log structured file and wherein data is sequentially written to the log structured file after a host write request is performed.

8. The system of claim 7, wherein a second write of data to the storage device after a second host write request is to a logical block address in the storage device, wherein the logical block address is specified in the second host write request.

9. The system of claim 8, wherein the reliability of the system is unaffected by the storage class memory device having lower reliability than a reliability of the storage device.

10. The system of claim 8, wherein data in the at least one storage class memory device is read to determine if a cache hit occurs after a read request from a host computer.

11. The system of claim 10, wherein data in the at least one storage class memory device is read to serve a cache hit after a read request from a host computer.

12. The system of claim 8, wherein data stored in the system is protected against loss unless data in the at least one storage class memory device and data in the second storage location are both lost.

13. The system of claim 8, wherein data stored in the system comprises data sent from a host computer during a host write request and metadata.

14. The system of claim 13, wherein the metadata protects against loss of the modifications unless data in the at least one storage class memory device and data in the second storage location are both lost.

15. The system of claim 8, wherein data is read from the second storage location only when data is to be recovered following a loss of data from the at least one storage class memory device or from the storage device.

16. The system of claim 8, wherein the storage device comprises a plurality of storage devices arranged in a selected Redundant Array of Independent Disks (RAID) configuration.

17. A computer system comprising:
a write-through-and-back cache comprising a storage class memory device stored on a relatively low reliability storage medium exhibiting lower reliability than a relatively high reliability storage medium; and
a plurality of storage devices comprising the relatively high reliability storage medium arranged in a selected Redundant Array of Independent Disks configuration,
wherein data received by the write-through-and-back cache is stored in the write-through-and-back cache and in first and second storage locations in the storage devices, and wherein the second storage location logically reflects the location of the data in the write-through-and-back cache;
wherein modifications to data stored in the write-through-and-back cache are written to both the write-through-and-back cache and to the second storage location;
wherein metadata is stored comprising pointers to locations for the modifications stored in the second storage location, wherein the metadata is stored in both the second storage location and the storage class memory device to protect against loss of the metadata stored in the storage class memory device, wherein the sequential log file is stored in a separate physical or virtual storage device than the storage class memory device; and
wherein, in the event of a loss of data stored in the write-through-and-back cache, the metadata is utilized to limit reading of the second storage location to recovery of data lost from the first storage location.

18. The computer system of claim 17, wherein the write-through-and-back cache further comprises:
a storage buffer adapted to receive input data corresponding to a write request from a host computer;
at least one storage class memory in data communication with the storage buffer and adapted to receive input data from the write request; and
a dynamic random access buffer in data communication with the storage class memory and with the storage devices.

19. The computer system of claim 18, further comprising:

at least one storage device of the Redundant Array of Independent Disks includes a sequential log file adapted for log-structured sequential writes; and data received from the host during a host write request is written to the storage class memory device, to the sequential log file, and to another storage device location.

20. The computer system of claim 19, wherein data in the storage class memory is log-structured and data in the write-through-and-back cache and the sequential log are mirrors of each other, thereby avoiding a need to track which data has been written to any of the plurality of storage devices.

21. A computer program product, comprising:

a non-transitory computer readable storage medium having computer readable program code embodied therewith, the computer readable program code comprising:

computer readable program code configured to receive a host write request from a host computer;

computer readable program code configured to create a sequential log file in a storage device;

computer readable program code configured to copy data received during the host write request to a storage buffer, wherein the storage buffer is configured as part of a write-through-and-back cache;

computer readable program code configured to determine if a selected quantity of data has been accumulated in the storage buffer;

computer readable program code configured to execute a write through of data to sequentially write the data accumulated in the storage buffer to the sequential log file and to a storage class memory device if the selected quantity of data has been accumulated in the storage buffer, wherein the sequential log file is stored in a separate physical or virtual storage device than the storage class memory device;

computer readable program code configured to receive modifications to data stored in the storage class memory device;

computer readable program code configured to save the modifications to both the storage class memory device and the sequential log file;

computer readable program code configured to store metadata comprising pointers to locations of the modifications stored in the sequential log file, wherein the metadata is stored in both the sequential log, file and the storage class memory device to protect against loss of the metadata stored in the storage class memory device; and computer readable program code configured to, in the event of a loss of data stored in the storage class memory device, utilize the metadata to limit reading of the sequential log file to recovery of data lost from the storage class memory device.

22. The computer program product of claim 21, further comprising:

computer readable program code configured to receive a host write request from the host computer if the selected quantity of data has not been accumulated in the storage buffer;

computer readable program code configured to execute a write back of data if it is determined that data is to be destaged from the storage class memory device; and computer readable program code configured to write the data to a specific logical block address in the storage device specified by the host write request.

23. The computer program product of claim 21, further comprising:

computer readable program code configured to limit reading of the sequential log file to recovery of data lost from either the storage class memory or the storage device.

24. The computer program product of claim 21, further comprising:

computer readable program code configured to store the metadata and the data received during the host write request on separate storage devices.

25. The computer program product of claim 21, further comprising:

computer readable program code configured to operate a write-through-and-back cache;

computer readable program code configured to operate at least one storage class memory device to communicate with the storage buffer and configured to receive input data from the write request; and computer readable program code configured to operate a dynamic random access buffer in communication with the storage class memory and with the storage device.

26. The computer program product of claim 25, further comprising:

computer readable program code configured to structure the storage class memory in a log-structure; and computer readable program code configured to mirror data in the write-through-and-back cache and in the sequential log to avoid a need to track which data has been written to the storage device.

* * * * *